(12) United States Patent
Ahmed (10) Patent No.: US 12,284,112 B2
(45) Date of Patent: Apr. 22, 2025

(54) MULTICAST STATE SYNCHRONIZATION (71) Applicant: Ruckus IP Holdings LLC, Claremont, NC (US)

(72) Inventor: Mohammad Nasir Ahmed, Bangalore (IN)

(73) Assignee: Ruckus IP Holdings LLC, Claremont, NC (US)

( * ) Notice: Subject to any disclaimer, the term of this patent is extended or adjusted under 35 U.S.C. 154(b) by 277 days.

(21) Appl. No.: 17/973,617

(22) Filed: Oct. 26, 2022

(65) Prior Publication Data

US 2023/0130865 A1    Apr. 27, 2023

(30) Foreign Application Priority Data

Oct. 27, 2021   (IN) .............................. 202141049056

(51) Int. Cl.
*H04L 45/24*   (2022.01)
*H04L 45/02*   (2022.01)

(52) U.S. Cl.
CPC .............. *H04L 45/24* (2013.01); *H04L 45/02* (2013.01)

(58) Field of Classification Search
CPC .......... H04L 45/24; H04L 45/02; H04L 45/16
See application file for complete search history.

(56) References Cited

U.S. PATENT DOCUMENTS

| | | | | |
|---|---|---|---|---|
| 7,729,350 | B2* | 6/2010 | Singh | H04L 45/04 370/432 |
| 8,102,848 | B1* | 1/2012 | Rao | H04L 45/586 370/312 |
| 8,576,703 | B2* | 11/2013 | Dholakia | H04L 49/201 455/445 |
| 9,059,907 | B2* | 6/2015 | Han | H04L 12/2807 |
| 2005/0180448 | A1* | 8/2005 | Kobayashi | H04L 12/185 370/432 |
| 2006/0146821 | A1* | 7/2006 | Singh | H04L 45/04 370/432 |
| 2008/0232368 | A1* | 9/2008 | Ikegami | H04L 12/185 370/390 |
| 2010/0040056 | A1* | 2/2010 | Kobayashi | H04L 12/1886 370/390 |
| 2010/0302952 | A1* | 12/2010 | Hoshi | H04L 45/60 370/250 |
| 2011/0228773 | A1* | 9/2011 | Dholakia | H04L 12/4641 370/503 |
| 2012/0033668 | A1* | 2/2012 | Humphries | H04L 45/245 370/390 |

(Continued)

*Primary Examiner* — Benjamin M Thieu
(74) *Attorney, Agent, or Firm* — Myers Bigel, P.A.

(57) ABSTRACT

Methods, systems, and devices for synchronizing multicast state in a cluster of network devices, such as network switches. For example, a method may include receiving a multicast control packet by an edge port of a first switch of a cluster comprising a plurality of switches; processing the multicast control packet by the first switch to update a local multicast state; manipulating the multicast control packet to insert a unique identifier associated with the edge port, resulting in a manipulated version of the multicast control packet; and forwarding, by the first switch of the cluster, the manipulated version of the multicast control packet to at least one other switch of the cluster via an inter-chassis link that couples the first switch and the at least one other switch.

19 Claims, 6 Drawing Sheets

(56) References Cited

U.S. PATENT DOCUMENTS

| | | | |
|---|---|---|---|
| 2013/0266009 A1* | 10/2013 | Colloff | H04L 12/1868 |
| | | | 370/390 |
| 2014/0254591 A1* | 9/2014 | Mahadevan | H04L 45/245 |
| | | | 370/390 |
| 2014/0269717 A1* | 9/2014 | Thubert | H04L 49/3009 |
| | | | 370/392 |
| 2014/0293779 A1* | 10/2014 | Kako | H04W 40/36 |
| | | | 370/230 |
| 2014/0362854 A1* | 12/2014 | Addanki | H04L 49/201 |
| | | | 370/390 |
| 2018/0041555 A1* | 2/2018 | Manohar | H04L 45/16 |
| 2023/0022760 A1* | 1/2023 | Nandy | H04L 12/4633 |

* cited by examiner

| DEVICE | SWITCH | CCEP | UNIQUE IDENTIFIER | |
|---|---|---|---|---|
| 13-1 | 120-1 | 13/1 | 246934 | 110 |
| 13-1 | 120-2 | 17/5 | 246934 | 111 |
| 13-2 | 120-1 | 14/1 | 123009 | 112 |
| 13-2 | 120-2 | 9/3 | 123009 | 113 |

MULTICAST STATE SYNCHRONIZATION

CROSS-REFERENCE TO RELATED APPLICATION

The present application claims the benefit of priority to Indian Patent Application No. 202141049056, filed on Oct. 27, 2021, in the Indian Patent Office, and the entire contents of the above-identified application are incorporated by reference as if set forth herein.

TECHNICAL FIELD

The present invention generally relates to network communications and, more particularly, to multicast network communications.

BACKGROUND

Multicast is a communication technology in which data may be transmitted to multiple destination computing devices simultaneously; an example use case of such a technology is live streaming multimedia. Multicast may be efficiently implemented in a network in a form sometimes referred to as network-assisted multicast. In network-assisted multicast, a source (such as a video content source) may generate a single stream of packets, and network devices of a computing network, such as routers and switches, may direct and replicate the single stream of packets as needed, resulting in multiple copies of the stream of packets each being delivered to a respective receiving computing devices.

Although multicast may be implemented at different layers of networking models (e.g., the OSI (Open Systems Interconnect) model, the RFC 1122 Internet model), one common implementation is Internet Protocol (IP) multicasting. In IP multicasting, IP datagrams (sometimes referred to as packets) are communicated to a group of interested receivers in a single transmission. IP multicasting is provided in both the historically dominant IP Version 4 (IPv4) and the increasingly utilized IP version 6 (IPv6).

Figure 1:
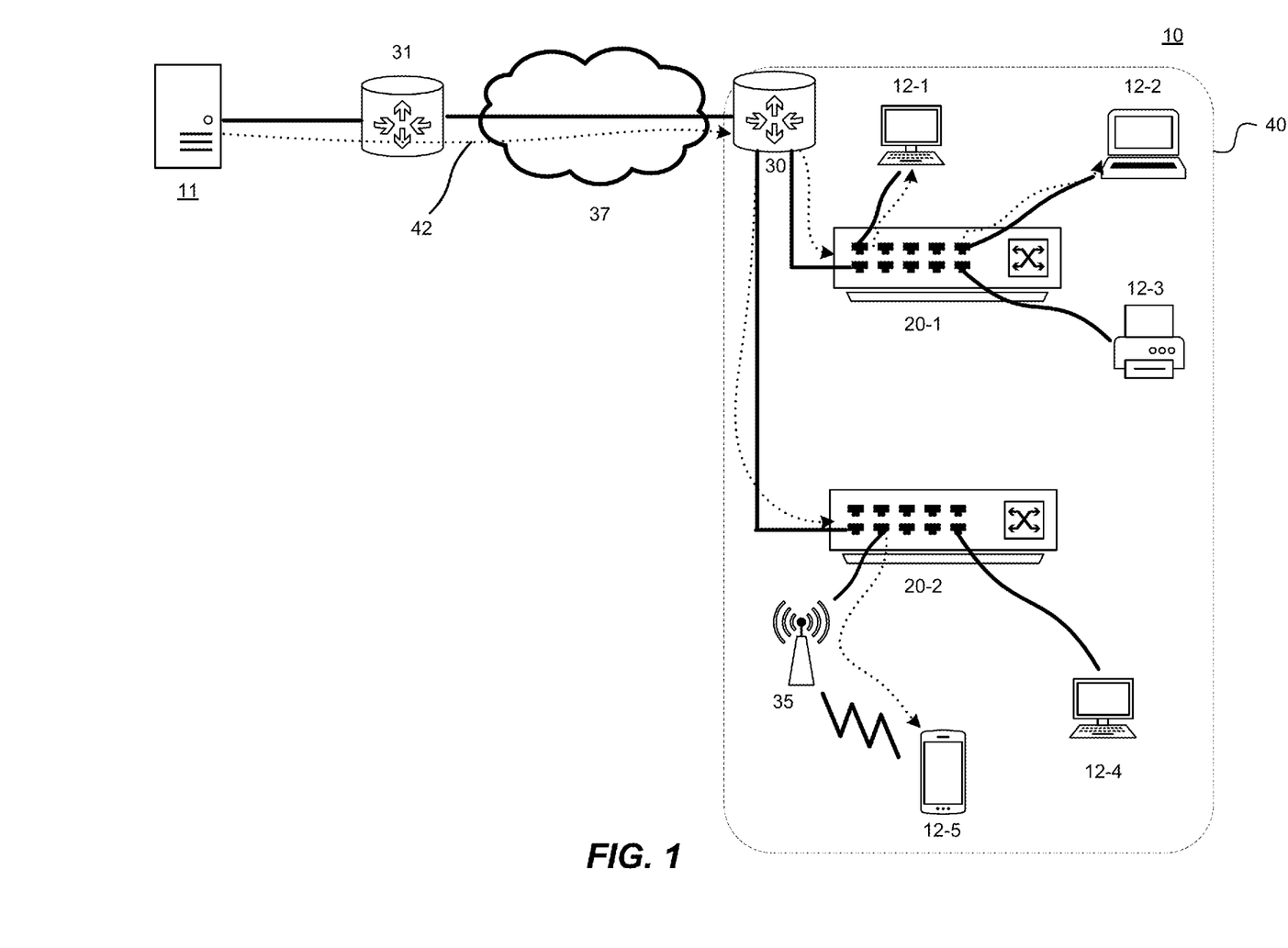
FIG. 1 is an example of a simple multicast topology or tree.

In IP multicasting, a source computing device uses a group address as the IP destination address in IP datagrams transmitted by the source. Receiving computing devices can then inform the network that they are interested in receiving packets sent to that group address. FIG. 1 is an example multicast topology or tree 10. For example, the source 11 can send data packets 42 to a first network address (239.X.Y.Z). Each interested receiver (here, client devices 12-1, 12-2, and 12-5) will inform the network (and more specifically, the upstream switches 20 and local router 30 that service the interested receivers) that the receivers 12 are interested in receiving data packets sent to the group 239.X.Y.Z.

More specifically, each receiving device 12 (sometimes referred to as a host) will transmit a message using a multicast management protocol, such as Internet Group Management Protocol (IGMP) for IPv4 and Multicast Listener Discovery (MLD) for IPv6. This message, called a Membership Report (or Report) message will be transmitted by the interested receiver 12-1, 12-2, 12-5 to a local multicast-enabled router 30. The local multicast-enabled router 30 will then generate and transmit messages to a neighboring routers (not shown) on a network 37 using a protocol such as Protocol Independent Multicast (PIM), resulting in a path to the multicast source 11 being created or joined. In some situations, this path terminates at one end with local router 31 that is serving as a rendezvous point for the multicast data from multicast source 11. In other situations (not illustrated in FIG. 1), multicast traffic may be broadcast from multicast source 11 to all routers 31 connected thereto, and from the routers 31 on to their neighbor routers, with individual routers able to unsubscribe or prune themselves from the broadcasted streams of packets.

When a multicast receiver 12 is no longer interested in a subscribed-to multicast stream, the multicast receiver 12 may send an IGMP or MLD Leave message to the local router 30. Periodically, and in part because such Leave messages are not strictly required, the local multicast-enabled router 30 may transmit IGMP or MLD Query messages to the hosts serviced by the router 30. Such Query messages are used by the multicast router 30 to determine which multicast addresses are of interest (or still of interest) to hosts, and help the router to refresh and maintain the group membership state for hosts serviced by the router.

There may be one or more intervening network devices, such as network switches 20 and access points 35, between a local multicast router 30 and a multicast receiver 12. These network devices also participate in network-assisted multicast and work to ensure that multicast streams are delivered to other network devices. Some network switches use message "snooping" and read IGMP or MLD messages that are addressed to other devices, both to learn the local topology of multicast-participating devices and reduce or prevent flooding devices with streams of unwanted multicast packets. In this way, uninterested devices (such as client devices 12-3 and 12-4) do not need to receive data traffic that is unnecessary to them.

SUMMARY

Aspects of the present disclosure may provide methods, devices, and systems that may provide more efficient mechanisms for synchronizing a multicast state between network devices of a cluster of network devices. For example, some embodiments of the present disclosure provide methods. According to some embodiments of the inventive concepts, a method may include: receiving a multicast control packet at an edge port of a first switch of a cluster that includes a plurality of switches; processing, by the first switch, the multicast control packet to update a local multicast state; manipulating the multicast control packet to insert a unique identifier associated with the edge port, resulting in a manipulated version of the multicast control packet; and forwarding, by the first switch of the cluster, the manipulated version of the multicast control packet to at least one other switch of the cluster via an inter-chassis link that couples the first switch and the at least one other switch.

Another example of a method provided by the inventive concepts disclosed herein may include: receiving a multicast control packet by a second switch of a cluster that includes a plurality of switches. The multicast control packet may be received from a first switch of the cluster and may include a unique identifier associated with an edge port of the first switch. The method may further include extracting, by the second switch, the unique identifier from the multicast control packet; identifying, by the second switch, a local port that corresponds to the unique identifier; and processing the multicast control packet in a context of the identified local port that corresponds to the unique identifier.

Some embodiments of the present disclosure provide devices and systems, such as network switches. For example, a network switch may include a processor. The network switch may also include memory storing non-transitory computer readable instructions that, when executed by the processor, cause the processor to: receive a first multicast control packet via an edge port of the network switch; process the first multicast control packet and update a local multicast state; manipulate the first multicast control packet and insert a unique identifier associated with the edge port, resulting in a manipulated version of the first multicast control packet; and forward the manipulated version of the first multicast control packet to at least one other switch via an inter-chassis link that couples the network switch and the at least one other switch.

The present disclosure is not limited to the embodiments explicitly discussed in this summary section, and other embodiments are provided herein.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

Figure 2:
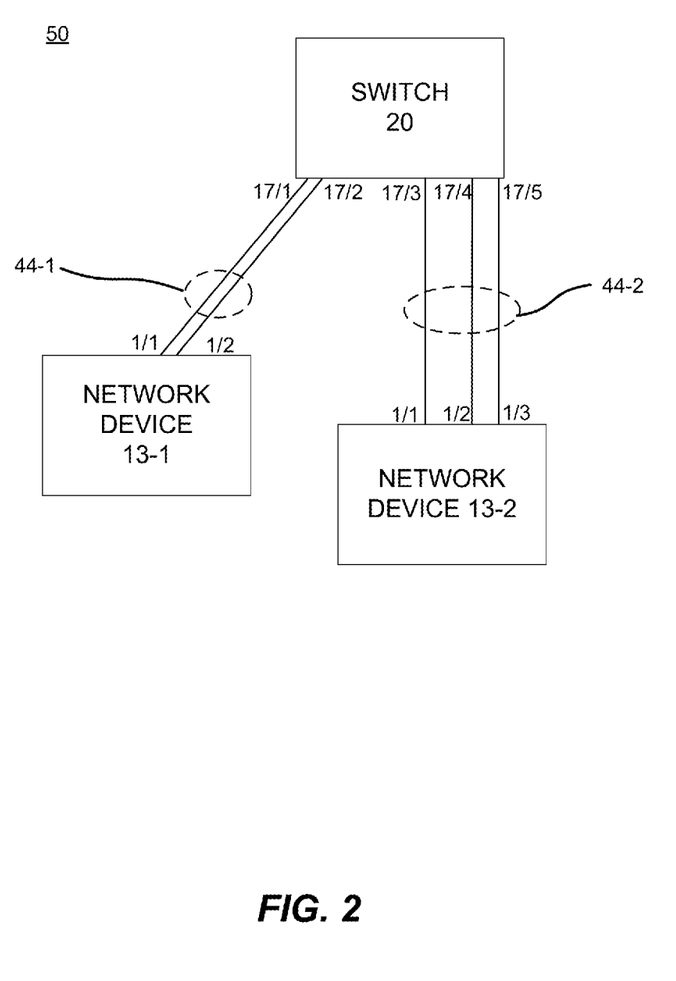
FIG. 2 is an example network topology that includes link aggregation groups.

Network traffic, including multicast traffic, may be communicated via different network communication technologies, such as link aggregation groups (LAGs), in which multiple network connections may be aggregated or combined in order to increase throughput and/or provided redundancy. FIG. 2 is an example network topology 50 that includes LAGs. A first network device 13-1 (may be coupled to a switch 20 via a first LAG 44-1, and a second network device 13-2 may be coupled to the switch 20 via a second LAG 44-2. LAGs 44 may sometimes be referred to as LAG trunks. The first and second network devices 13-1 and 13-2 may each be a switch (e.g., another switch 20), an access point 35, a router 30, a client device (e.g., one of the multicast receivers 12 of FIG. 1), or a different network-enabled computing device.

The first LAG 44-1 may be a two-port or two-link LAG, in which two ports 1/1 and 1/2 of the first client device 12-1 are coupled respectively to two ports 17/1 and 17/2 of the switch 20. Traffic may be communicated between the first network device 13-1 and the switch 20 via either or both links of the first LAG 44-1. The second LAG 44-2 may be a three-port or three-link LAG, in which three ports 1/1-1/3 of the second network device 13-2 are coupled respectively to three ports 17/3-17/5 of the switch 20. In some embodiments, the first LAG 44-1 and the second LAG 44-2 may appear to the respective network devices 13-1 and 13-2 as a single logical link.

LAGs, and link aggregation generally, may provide link level redundancy and load sharing in addition to increased capacity. However, LAGs such as those shown in FIG. 2 do not provide switch or node level redundancy. In other words, if the switch 20 of FIG. 2 fails, all of the links of each of the LAGs 44-1 and 44-2 will also fail, potentially resulting in a complete loss of network connectivity for network devices 13-1 and 13-2.

Figure 3:
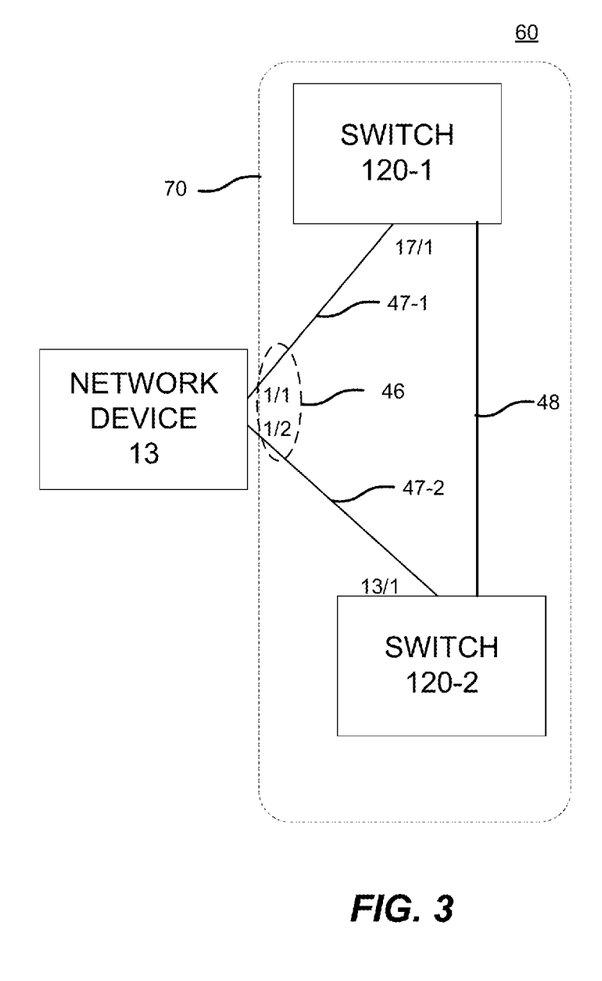
FIG. 3 is an example network topology that includes multi-chassis trunking groups.

One way to provide switch or node level redundancy is Multi-Chassis Trunking (MCT), sometimes referred to as multi-chassis link aggregation groups (MLAGs). FIG. 3 illustrates an example of a MCT topology 60 that includes a cluster 70 of two switches 120-1 and 120-2. A network device 13 may be coupled to a first switch 120-1 and a second switch 120-2 via respective physical links 47, a first link 47-1 between a port 1/1 of the network device 13 and a port 17/1 of the first switch 120-1, and a second link 47-2 between port 1/2 of the network device 13 and a port 13/1 of the second switch 120-2. The physical links 47 may be bundled into a single MCT LAG 46. The physical ports or trunk group interface on the switches 120 that are connected to the network device 13 may be referred to as cluster client edge ports (CCEP).

The switches 120 of the cluster 70 may be directly connected using an Inter-Chassis Link (ICL) 48, which may enable data and control messages to flow between the switches 120. For example, data from a data source (not shown in FIG. 3) destined for the network device 13 may be received at the second switch 120-2 at a time when the second physical link 47-2 is not available (e.g., the second physical link 47-2 is disconnected). The data may be communicated via the ICL 48 to the first switch 120-1, which may then communicate the data to the network device 13 via the first physical link 47-1. In other words, if a data path via one switch 120 of the cluster 70 fails, a data path will remain operational through the remaining switches 120 of the cluster 70. Moreover, so long as one switch 120 of the cluster 70 remains operational, and the physical link 47 coupled thereto remains operational, the network device 13 may retain network connectivity.

The MCT LAG 46 may appear to the network device 13 as a "normal" LAG. In other words, the network device 13 may not be aware that end points of the physical links 47 that are opposite from the network device 13 are in fact coupled to two different switches 120 of the cluster 70. As with FIG. 2, the network device 13 of FIG. 3 may be a switch (e.g., a switch 20 that is not part of the cluster 70), an access point 35, a router 30, a client device (e.g., one of the multicast receivers 12 of FIG. 1), or a different network-enabled computing device.

In some embodiments, a physical link 47 may include two or more physical links. In other words, the MLAG 46 may include a first LAG of two or more links to the first switch 120-1 and/or a second LAG of two or more links to the second switch 120-2. In some embodiments, the ICL 48 may be a LAG.

Multicast traffic may be communicated between the cluster 70 and the network device 13 of FIG. 3. In order for multicast traffic to be communicated, especially during abnormal network conditions (such as when one of the physical links is down, a failover event occurs, a link upgrade is happening, etc.), the switches 120 of the cluster 70 may need to coordinate and synchronize their multicast state.

Figure 4:
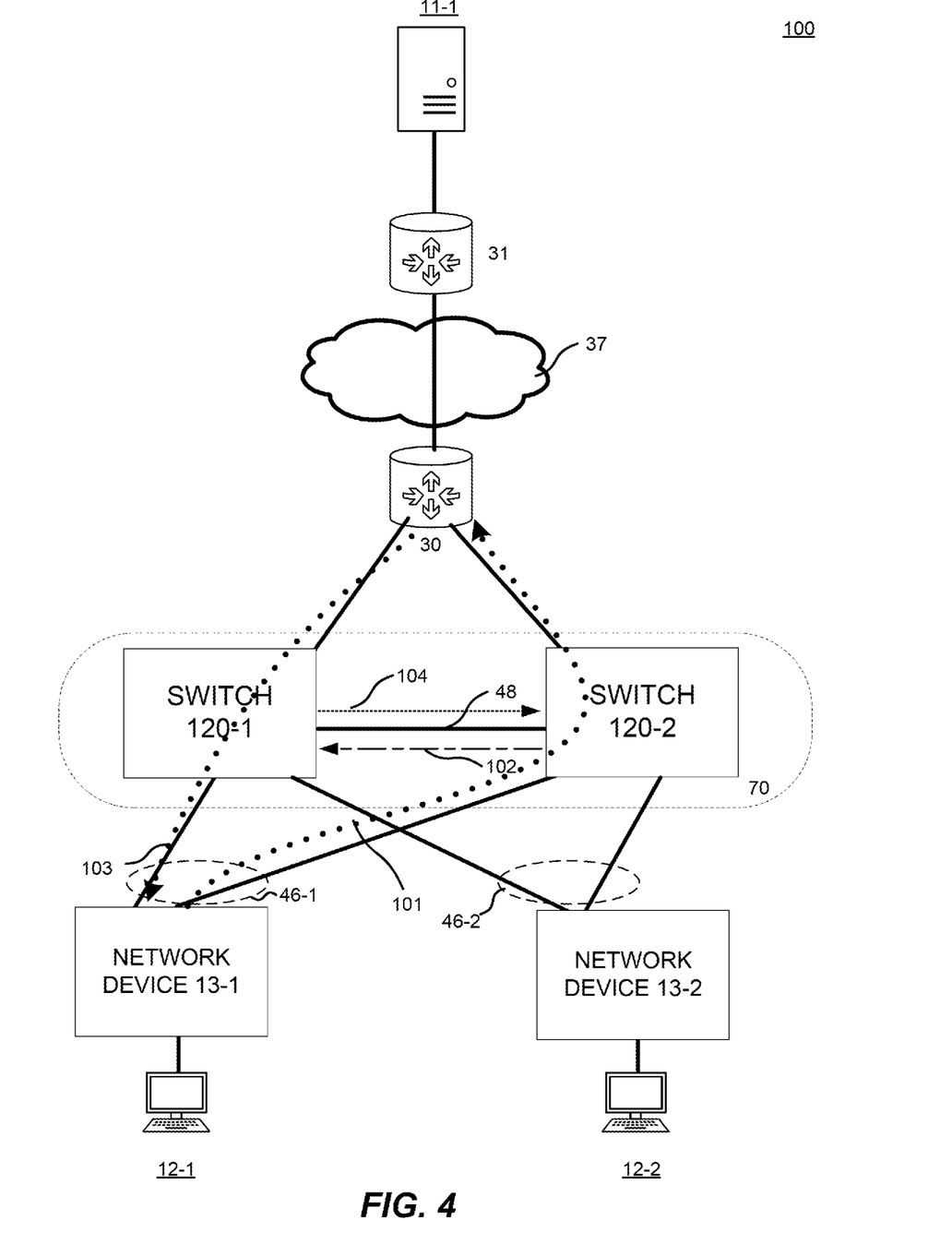
FIG. 4 is an example network topology that shows some multicast data and control traffic.

FIG. 4 illustrates a network topology 100 that is similar in some respects to that of FIG. 3, but in which some additional devices and some multicast data and control traffic is shown. With reference to the discussion above, and as an example, a first network device 13-1 or a network-connected device downstream from the network device 13 (e.g., a multicast receiving device or host 12-1) may desire to receive a stream of multicast packets. Accordingly, the desiring device 12-1 may transmit a Membership Report message 101 using a multicast management protocol, such as IGMP or MLD. This Report message will be received by a second of the switches 120-2 of the cluster 70, which can then forward to the local multicast-enabled router 30. The second switch 120-2 may also use message "snooping" to read the Membership Report message 101, for example to learn the local topology of multicast-participating devices and reduce or prevent flooding other devices with streams of unwanted multicast packets.

Multicast data packets 103 intended for the first network device 120-1 may then be received from the multicast source 11 via the network 37 by the first switch 120-1. If the first switch 120-1 does not receive information 102 about the Membership Report message 101 from the second switch 120-2, then the first switch may drop the multicast packets, may flood all ports (e.g., send them to both the first network device 13-1 and a second network device 13-2), and/or send them to the second switch 120-2 as stream 104. This may result in either a delay in sending the data packets 103 to the intended network device, inefficient usage of the network, duplicate packet transmission, and/or other problems.

The present disclosure is based in part on the recognition that there are inefficiencies in various known or proposed methods for performing multicast state synchronization. For example, a first switch 120 of the cluster 70 may be configured with additional software to replicate the multicast control packet (e.g., the Membership Report packet discussed above) and transmit the replicated packet across the ICL 48 to the peer switches 120. This approach suffers from a relatively large administrative overhead and also requires additional software development and maintenance overhead. For example, the replicated multicast control packet received by the peer switches 120 must be translated for each peer switch 120, as the data therein is in the context of the first switch 120-1. The peer switch 120 lacks an understanding of which network device 13 is the origin of the multicast control packet. Additionally, the multicast control packet, depending on a size thereof, may be split into two or more packets, creating a potential difficulty in reconstituting the packet at the receiving switch 120.

Another approach to perform synchronization of multicast state between two switches 120 may be to use a protocol, such as a cluster communication protocol (CCP), where a multicast control packet is received by a first switch and either encapsulated or converted to a different packet format. For example, an IGMP membership report packet may be encapsulated into a CCP packet and communicated via the ICL 48, or the IGMP membership report packet may be converted to a CCP formatted packet and the CCP formatted packet may be communicated via the ICL 48. This approach is quite complex and adds complexity to software development and maintenance. For example, this approach requires either encapsulating or formatting software running on each switch 120 for each different multicast control packet to be communicated via the ICL 48. As there are many different control packets of interest, this complexity could be quite significant.

A third approach to perform synchronization of multicast state between two switches 120 may be to use a lookup table or other data store that maps an association between Ethernet Media Access Control (MAC) addresses, multicast state for each MAC address, and CCEP Ports. As packets traverse the network and switches 120, a MAC module present in each switch 120 may identify an association between a MAC address and a port of the switch 120. For example, the first switch 120-1 may identify a MAC address RR:SS:TT:XX:YY:ZZ as associated with a first port of the first switch 120. The second switch 120-2 may identify the MAC address RR:SS:TT:XX:YY:ZZ as associated with a second port of the second switch 120-2. The first and second switch 120-1 and 120-2 may communicate entries in their MAC modules and eventually learn that the first port of the first switch 120-1 and the second port of the second switch 120-2 are associated with the same MAC address, and share multicast state information based on the learned association. Although this approach has advantages, it is recognized that there are some scenarios where the MAC table/data store information may not be synchronized due to processing overhead; this may lead to multicast state synchronization problems. Additionally, MAC addresses are not static and may be dynamically reassigned, which may create errors if a first MAC address is known to the first switch 120-1 and a second MAC address is known to the second switch 120-2.

Figure 5:
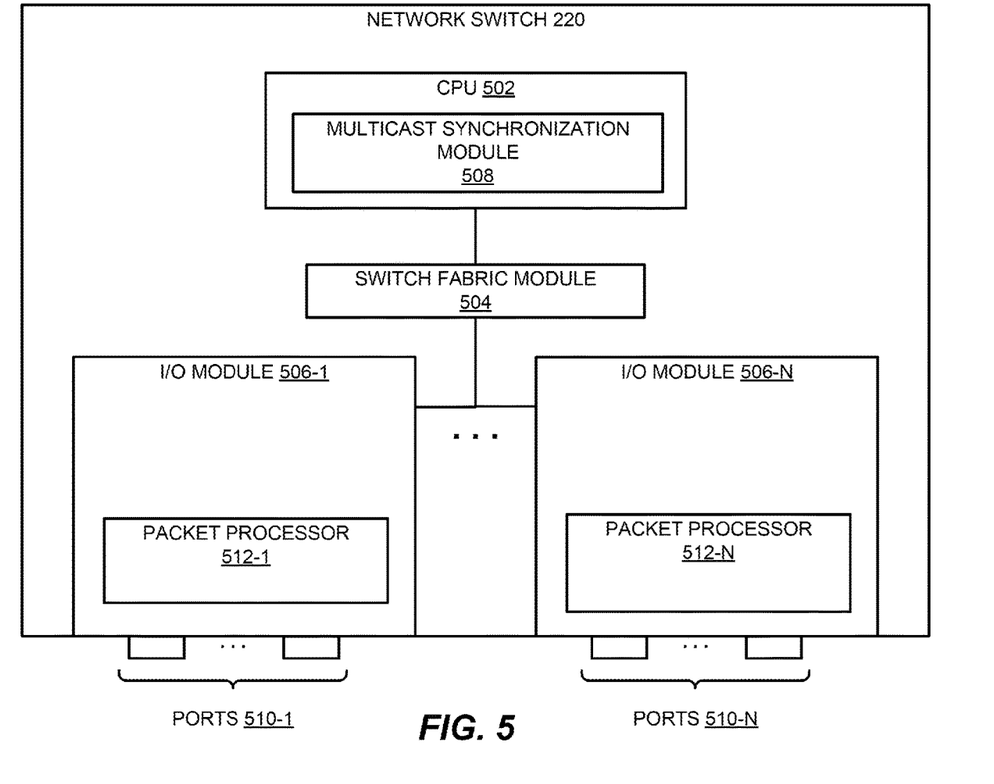
FIG. 5 illustrates a block diagram of an example of a network switch.

A more efficient mechanism for synchronizing a multicast state between network devices of a cluster of network devices than those discussed above is contemplated by the present disclosure. FIG. 5 illustrates a block diagram of an example of a network switch 220, which may provide such a mechanism for synchronizing a multicast state between network devices of a cluster of network devices. Network switch 220 may be used as network switch 120 of FIGS. 3 and 4.

As shown in FIG. 5, the network switch 220 includes one or more CPUs 502, at least one I/O module 506, and a switch fabric module 504.

The one or more CPUs 502 are configured to manage and/or control the operation of the switch 220. Each CPU 502 can be a general-purpose processor, such as a PowerPC, Intel, AMD, or ARM-based processor that operates under the control of software stored in an associated memory (not shown in FIG. 4). The software may include a multicast state synchronization module 508 described in greater detail below. Additional functionality may be present in the processor and/or memory, but may not be shown in the block diagram of FIG. 5 to simplify the illustration.

The switch fabric module 504 and I/O modules 506 collectively represent the forwarding plane of network switch 220. The switch fabric module 504 is configured to interconnect the various other modules of network switch 220. Each I/O module 506 can include one or more input/output ports 510 that are used by network switch 220 to send and receive data and control packets. Each I/O module 506 can also include a packet processor 512. The packet processors 512 may be hardware processing components (e.g., an ASIC or Field Programmable Gate Array (FPGA)) that can make wire speed decisions on how to handle incoming or outgoing packets that are received via the ports 510 of the network switch 220. At least one of the ports 510 of the network switch 220 may be configured to connect to another switch 220 via an Inter-Chassis Link (ICL).

The multicast state synchronization module 508 may be configured to receive multicast control packets and process the multicast control packets to maintain multicast group associations for the network switch 220. For example, the multicast state synchronization module 508 may be configured to maintain a membership database that stores associations between a port 510 and the multicast groups or streams that are intended for the port 510.

The multicast state synchronization module 508 may also manipulate the received multicast control packet and communicate the manipulated packet to peer switches via the ICL. The manipulated packet may include an identification value therein that uniquely identifies the network device 13 from which the multicast control packet was received.

Figure 6:
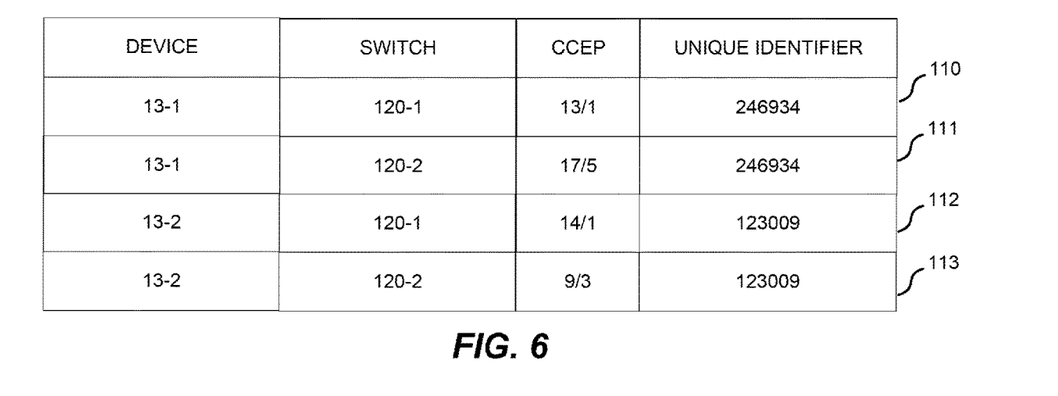
FIG. 6 illustrates examples of associations between network devices, network switch ports, and unique identifiers.

In greater detail, each port 510 of a switch 220 that is part of a MCT LAG (e.g., each CCEP port) may be assigned an identification value during an initial configuration process. The identification value may uniquely identify the MCT LAG. This information may be stored in a table associated with the CPU 502 and accessible by the multicast state synchronization module 508. For example, FIG. 6 illustrates examples of associations for the first network device 13-1 and the second network device 13-2 of FIG. 4 within a cluster 70. The first switch 120-1 may store in the table accessible by the multicast state synchronization module 508 the data from rows 110 and 112, and the second switch 120-2 may likewise store therein the data from rows 111 and 113. It may be seen that, despite being stored on different switches 120-1 and 120-2, the unique identifier '246934' may identify the first network device 13-1 to both the first switch 120-1 and the second switch 120-2, and likewise the unique identifier '123009' may identify the second network device 13-2 to the switches 120.

Figure 7:
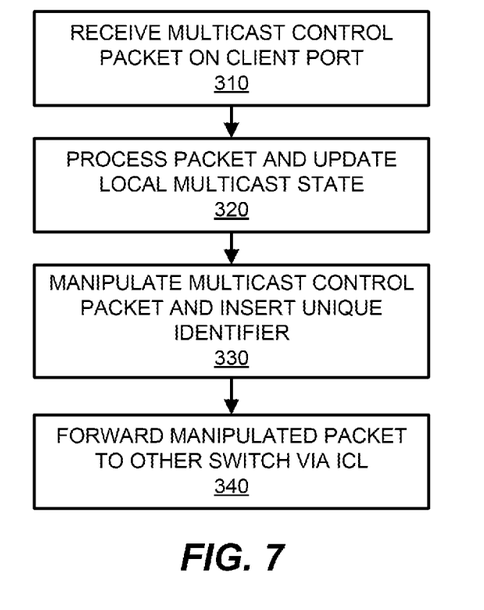
FIG. 7 is a flowchart illustrating operations of a method of receiving a multicast control packet by an edge port of a first switch of a cluster, and forwarding a manipulated version of the multicast control packet to at least one other switch of the cluster.

The unique identifier may be used by the switches 120 of the cluster 70 to synchronize multicast state for the network devices 13. FIG. 7 is a flowchart illustrating operations of a method of receiving, by an edge port of a first switch 120 of a cluster 70, a multicast control packet, and forwarding a manipulated version of the multicast control packet to at least one other switch 120 of the cluster 70. A multicast control packet may be received by a first switch 120-1 on a port 510 thereof (block 310). The multicast control packet may be, as an example, an IGMP message or a MLD message. The first switch 120-1 may receive the multicast control packet and process the packet to update a local multicast state (block 320). For example, the first switch 120-1 may update the local membership database or data store with multicast group information.

The multicast control packet may then be manipulated by the first switch 120-1 and a unique identifier associated with the port 510 on which the multicast control packet was received may be inserted into the multicast control packet (block 330). In some embodiments, an identifier of the port 510 may be used as a lookup value to retrieve the unique identifier. The unique identifier that is inserted into the multicast control packet may replace data within a field of the multicast control packet. For example, the IGMP Membership Report packet may include a checksum field, and the MLD Membership Report packet may include a reserved field. Information stored in the checksum field or reserved field (as examples) may be replaced with the unique identifier. The manipulated packet may be forwarded to the peer switches 120 of the first switch 120-1 via the ICL 48 (block 340). In some embodiments, the original packet may be forwarded to routers 30 coupled to the first switch 120-1.

Figure 8:
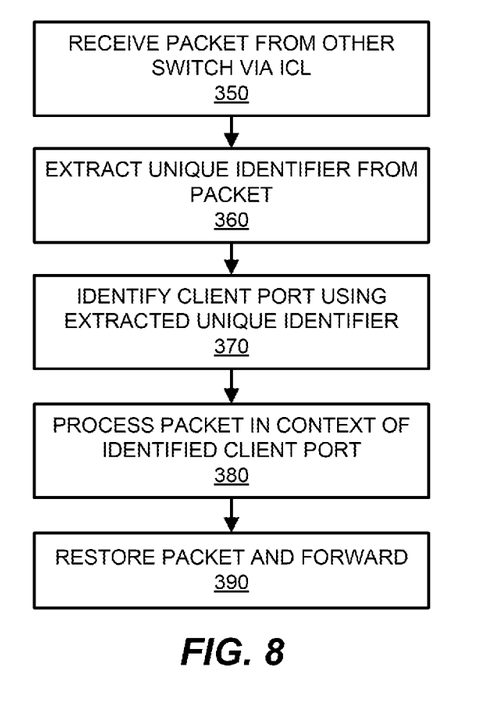
FIG. 8 is a flowchart illustrating operations of a method of receiving, from a first switch of a cluster and by a second switch of the cluster, a multicast control packet, and processing the multicast control packet to synchronize a multicast state between the first switch and the second switch.

FIG. 8 is a flowchart illustrating operations of a method of receiving, from a first switch 120-1 of a cluster 70 and by a second switch 120-2 of the cluster 70, a multicast control packet, and processing the multicast control packet to synchronize a multicast state between the first switch 120-1 and the second switch 120-2.

The multicast control packet (e.g., the manipulated multicast control packet resulting from the operations of FIG. 7) may be received by a second switch 120-2 via an ICL 48 (block 350). The second switch 120-2 may extract the unique identifier from the multicast control packet (e.g., from the checksum or reserved field of the packet) (block 360). Using the extracted unique identifier, the second switch 120-2 may identify a CCEP (and by extension, a MCL LAG and network device 13) associated with the extracted unique identifier (block 370). In some embodiments, the unique identifier may be used as a lookup value to obtain an identifier a port 510 of the second switch 120-2. The multicast control packet may then be processed by the second switch 120-2 in the context of the identified client port 510 to update a local multicast state (block 380). For example, the second switch 120-2 may process the packet to update a local membership database or data store with multicast group information.

The multicast state synchronization module 508 of the second switch 120-1 may then restore the multicast control packet to a pre-manipulation state and forward the restored multicast control packet (block 390). For example, the multicast state synchronization module 508 may calculate the IGMP checksum or reset the MLD reserved field that was removed or overwritten by the first switch 120-1. This calculation may be based on other fields present in the multicast control message. The restored multicast control packet may then be forwarded to routers 30 coupled to the second switch 120-2.

As compared with the approaches discussed above, the operations of FIGS. 7 and 8 may be implemented using a relatively small amount of software, and provides an efficient usage of CPU resources, as packet encoding and decoding may be minimized. The operations of FIGS. 7 and 8 may also be able to utilize already-implemented packet processing software. Additionally, the operations of FIGS. 7 and 8 may avoid extra state synchronization overhead configuration, improving efficiency of the functioning of the cluster 70 and the devices thereof.

Figure 9:
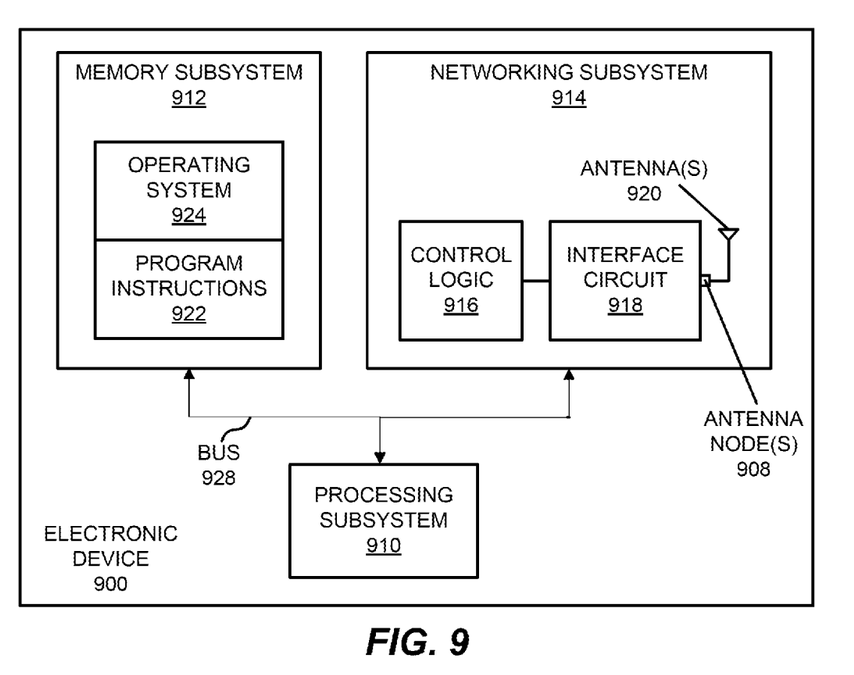
FIG. 9 is a block diagram illustrating an electronic device in accordance with some embodiments.

FIG. 9 is a block diagram illustrating an example electronic device 900 in accordance with some embodiments. Examples of electronic devices 900 may be the networking devices described with reference to FIG. 1-4, including the switches and client devices described with reference to FIGS. 1-4. The electronic device 900 includes a processing subsystem 910, a memory subsystem 912, and a networking subsystem 914. Processing subsystem 910 includes one or more devices configured to perform computational operations. Memory subsystem 912 includes one or more devices for storing data and/or instructions. In some embodiments, the instructions may include an operating system and one or more program modules which may be executed by processing subsystem 910.

Networking subsystem 914 includes one or more devices configured to couple to and communicate on a wired (i.e., to perform network operations), including: control logic 916 and an interface circuit 918, and optionally one or more antennas 920 and/or antenna nodes 908. Networking subsystem 914 includes processors, controllers, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Electronic device 900 may use the mechanisms in networking subsystem 914 for transmitting packets to other devices and for receiving packets from other devices.

Processing subsystem 910, memory subsystem 912, and networking subsystem 914 are coupled together using bus 928. Bus 928 may include an electrical, optical, and/or electro-optical connection that the subsystems can use to communicate commands and data among one another.

The operations performed in the communication techniques according to embodiments of the present invention may be implemented in hardware or software, and in a wide variety of configurations and architectures. For example, at least some of the operations in the communication techniques may be implemented using program instructions 922, operating system 924 (such as a driver for interface circuit 918) or in firmware in interface circuit 918. Alternatively, or additionally, at least some of the operations in the communication techniques may be implemented in a physical layer, such as hardware in interface circuit 918.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A method, comprising:
   receiving a multicast control packet by an edge port of a first switch of a cluster comprising a plurality of switches;
   processing the multicast control packet by the first switch to update a local multicast state;
   manipulating the multicast control packet to insert a unique identifier associated with the edge port on which the multicast control packet was received, resulting in a manipulated version of the multicast control packet; and
   forwarding, by the first switch of the cluster, the manipulated version of the multicast control packet to at least one other switch of the cluster via an inter-chassis link that couples the first switch and the at least one other switch.

2. The method of claim 1, wherein updating the local multicast state comprises updating a local membership database with multicast group information indicated by the multicast control packet.

3. The method of claim 1, wherein the multicast control packet is an Internet Group Management Protocol (IGMP) packet.

4. The method of claim 3, wherein the unique identifier is inserted into a checksum field of the IGMP packet.

5. The method of claim 1, wherein the multicast control packet is a Multicast Listener Discovery (MLD) packet.

6. The method of claim 5, wherein the unique identifier is inserted into a reserved field of the MLD packet.

7. The method of claim 1, further comprising:
   receiving the manipulated version of the multicast control packet by a second switch of the cluster;
   extracting the unique identifier from the manipulated version of the multicast control packet;
   identifying, by the second switch of the cluster, a local port that corresponds to the unique identifier; and
   processing the manipulated version of the multicast control packet in a context of the identified local port that corresponds to the unique identifier.

8. The method of claim 7, further comprising:
   restoring, by the second switch of the cluster, the multicast control packet to a pre-manipulation state, resulting in a restored multicast control packet; and
   forwarding the restored multicast control packet to a router coupled to the second switch.

9. The method of claim 8, wherein restoring the multicast control packet to the pre-manipulation state comprises calculating a value and inserting the calculated value into the multicast control packet.

10. The method of claim 9, wherein the value is a checksum value.

11. A method comprising:
    receiving a multicast control packet by a second switch of a cluster comprising a plurality of switches, the multicast control packet received from a first switch of the cluster and comprising a unique identifier associated with an edge port of the first switch;
    extracting, by the second switch, the unique identifier from the multicast control packet;
    identifying, by the second switch, a local port that corresponds to the unique identifier;
    processing the multicast control packet in a context of the identified local port that corresponds to the unique identifier; and restoring, by the second switch, the multicast control packet to a pre-manipulation state, resulting in a restored multicast control packet; and forwarding the restored multicast control packet to a router coupled to the second switch.

12. The method of claim 11, wherein the multicast control packet is an Internet Group Management Protocol (IGMP) packet.

13. The method of claim 12, wherein the unique identifier is extracted from a checksum field of the IGMP packet.

14. The method of claim 11, wherein the multicast control packet is a Multicast Listener Discovery (MLD) packet.

15. The method of claim 14, wherein the unique identifier is extracted from a reserved field of the MLD packet.

16. A network switch comprising:
a processor; and
memory storing non-transitory computer readable instructions that, when executed by the processor, cause the processor to:
  receive a first multicast control packet via an edge port of the network switch;
  process the first multicast control packet and update a local multicast state;
  manipulate the first multicast control packet and insert a unique identifier associated with the edge port on which the first multicast control packet was received, resulting in a manipulated version of the first multicast control packet; and
  forward the manipulated version of the first multicast control packet to at least one other switch via an inter-chassis link that couples the network switch and the at least one other switch.

17. The network switch of claim 16, wherein the network switch is configured to manipulate Internet Group Management Protocol (IGMP) packets.

18. The network switch of claim 16, wherein the network switch is configured to manipulate Multicast Listener Discovery (MLD) packets.

19. The network switch of claim 16, wherein the memory stores additional instructions that, when executed by the processor, cause the processor to:
  receive a manipulated version of a second multicast control packet from a second switch via the inter-chassis link;
  extract a unique identifier from the manipulated version of the second multicast control packet;
  identify a local port that corresponds to the unique identifier;
  process the manipulated version of the second multicast control packet in a context of the identified local port that corresponds to the unique identifier; and
  restore the manipulated version of the second multicast control packet to a pre-manipulation state.

* * * * *